United States Patent [19]

Rijpers et al.

[11] Patent Number: 4,798,994
[45] Date of Patent: Jan. 17, 1989

[54] LOW REFLECTANCE DISPLAY DEVICE

[75] Inventors: Johannes C. N. Rijpers; Henricus M. De Vrieze, both of Eindhoven, Netherlands

[73] Assignee: U.S. Philips Corporation, New York, N.Y.

[21] Appl. No.: 93,450

[22] Filed: Sep. 4, 1987

[30] Foreign Application Priority Data

Sep. 5, 1986 [GB] United Kingdom ............... 8621468

[51] Int. Cl.$^4$ .................... H01J 29/88; G02B 1/10
[52] U.S. Cl. .................... 313/478; 313/112; 350/166; 350/164
[58] Field of Search ............... 313/478, 474, 477, 112, 313/480; 350/116, 164, 166

[56] References Cited

U.S. PATENT DOCUMENTS

| | | | |
|---|---|---|---|
| 2,478,385 | 8/1949 | Gaiser | 350/164 |
| 2,612,611 | 9/1952 | Szegho et al. | 313/478 X |
| 2,680,205 | 6/1954 | Burton | 313/478 |
| 3,185,020 | 5/1965 | Thelen | 358/252 X |
| 3,635,751 | 1/1972 | Long, III et al. | 313/478 X |
| 4,065,696 | 12/1977 | Steierman | 313/480 |
| 4,196,246 | 4/1980 | Takayama et al. | 350/164 X |
| 4,264,133 | 4/1981 | Sakurai | 350/164 |
| 4,277,286 | 7/1981 | Boyd et al. | 313/480 X |
| 4,387,960 | 6/1983 | Tani | 350/164 |
| 4,568,140 | 2/1986 | Van Derwerf et al. | 350/166 X |

OTHER PUBLICATIONS

"Reactively Sputtered Optical Coatings...", by W. T. Pawlewicz et al., NBS Spec. Publ. (U.S.) 1980, 568, 359-75 (ENG.).

*Primary Examiner*—Palmer C. DeMeo
*Attorney, Agent, or Firm*—F. Brice Faller

[57] ABSTRACT

An anti-reflection coating which comprises at least a three layer interference filter is evaporated on the external surface of a faceplate panel. The manufacture of the coating can be speeded-up substantially by selecting high and low refractive index materials which can be evaporated at ambient temperatures and subsequently hardened by high temperature annealing outside the evaporation apparatus. The annealing is carried out most conveniently during the standard processing of a cathode ray tube.

6 Claims, 3 Drawing Sheets

LOW REFLECTANCE DISPLAY DEVICE

BACKGROUND OF THE INVENTION

The present invention relates to a method of making a display device, such as a cathode ray tube, a liquid crystal display device and a solid-state electroluminescent display device, and to a display device made by the method. More particularly the invention is concerned with reducing the reflectance of a viewing screen.

Display devices have to be capable of being viewed under varying lighting conditions. However since the brightness of an image being displayed on a device is limited, the contrast must be as high as possible, so that even under conditions of high-intensity ambient-light levels a clearly visible picture is presented to the viewer. Consequently display device manufacturers endeavour to increase the contrast of such devices and one technique is to reduce the amount of ambient light reflected by the glass faceplate, glass having a reflectance of 4.9%.

As the sensitivity of the human eye has a peak sensitivity at about 550 nm (nanometers) and decreases to zero below 400 nm and above 700 nm, then this is the part of the spectrum which is of interest.

There have been prior proposals relating to reducing the reflectance from cathode ray tube faceplates. European Patent Publication No. 0 131 341, to which U.S. Application Ser. No. 926,820 corresponds, discloses mechanically roughening the outer surface of a cathode ray tube faceplate and vapour depositing a single layer of $\lambda/4$ thick magnesium fluoride ($MgF_2$), where $\lambda$ is the peak sensitivity wavelength, that is about 550 nm. The refractive indices of air, glass and $MgF_2$ are respectively 1.0, 1.57 and 1.39. Although such an arrangement reduces the reflectively at the faceplate, it does have some disadvantages including (1) the reduction in reflectivity is a maxima at the peak sensitivity wavelength and is progressively less on either side of this peak sensitivity wavelength and (2) in order to obtain a layer having the required degree of hardness the $MgF_2$ has to be deposited onto a heated substrate. Typically the minimum temperature for the substrate, that is the faceplate, is 200° C. but a temperature of 250° C. is preferable. As the heating of the faceplate takes place under vacuum, the heat transfer is by radiation which is slow and takes about one hour. It is possible to vapour deposit layers of $MgF_2$ at lower temperatures but these layers do not have the required degree of hardness to be of use as anti-reflection coatings. Such layers cannot be hardened further by annealing after deposition.

In the description and claims reference is made to materials having low, medium and high refractive indices (n). These relative terms are related to the refractive index of the material, for example glass, forming an optically transparent faceplate panel. For a glass having n=1.5 then a low value for n may be equal to or less than 1.5, a medium value for n may lie in the range of greater than 1.50 and less than 1.80, and a high value for n may be equal to or greater than 1.80.

The reflectivity characteristic of the anti-reflection coating should be such that in the visible part of the spectrum it has a substantially constant value and ideally be zero. In the case of a laser it is known to use an interference filter comprising a first layer having a relatively high refractive index applied to the faceplate and a contiguous second layer having a relatively low refractive index. Such an arrangement is known as a V-coating because the reflection characteristic is of generally V-shape with the vertex or minimum reflectance at the wavelength of the laser light. The flanks of the V-characteristic can be modified using a three layer interference filter comprising a first layer of a material, such as $Al_2O_3$, having a medium refractive index, a second thicker contiguous layer of a material, such as $TiO_2$, having a relatively high refractive index and a third contiguous layer of a lesser thickness than the second layer and being of a material, such as $MgF_2$, having a relatively low refractive index. This coating is known as a W-coating because it has a wider characteristic with two minima, one on either side of the centre wavelength. As far as is known such anti-reflection coatings are vapour deposited onto substrates heated to about 300° C. in order to obtain the required degree of hardness and scratch resistance. The materials used in making these layers cannot be hardened by subsequent annealing.

SUMMARY OF THE INVENTION

It is an object of the present invention to provide a scratch resistant anti-reflection coating on a display device by a method which does not require special heating of a substrate (or faceplate) above the ambient temperature prevailing inside the processing vessel.

According to the present invention there is provided a method of making a display device, comprising the step of providing a hardened anti-reflection coating on an external surface of a faceplate panel, by vacuum evaporating at least 3 filter layers on to the faceplate panel in an evaporation apparatus which is at ambient temperature. The material of one of the layers has a high refractive index with respect to that of the material of the faceplate panel and the material of another one of the layers has a low refractive index with respect to that of the material of the faceplate panel, the materials comprising the layers having a medium degree of hardness after evaporation. The method further comprises the step of hardening the layers by annealing outside the evaporation apparatus at an elevated temperature.

Although an acceptable anti-reflection coating can be made from 3 layers, it is preferred that the coating comprises 4 or more layers in order to be less dependent on the material choice.

By selecting materials such as niobium pentoxide ($Nb_2O_5$), silicon oxide ($SiO_2$) and aluminium oxide ($Al_2O_3$) it is possible to evaporate them at ambient temperatures, of the order of 80° C., prevailing in the vacuum evaporation vessel, to produce layers of a medium degree of hardness which can then be made to have a high degree of hardness by annealing at elevated temperatures outside the evaporation vessel. Avoiding having to heat the substrate (or faceplate) saves heating time in a vacuum. Additionally, if the annealing step is part of the normal processing of the cathode ray tube this time saving becomes effective.

Producing anti-reflection coatings this way has been found to produce filter layers with little or no crazing.

If desired the outer surface of the faceplate may be mechanically roughened in order to reduce the specular reflectance of the faceplate.

In one embodiment of an anti-reflective four layer coating the first and second layers applied to the faceplate are each thinner than the outermost layer. The first layer has a high refractive index and may comprise $Nb_2O_5$. The outermost layer may comprise $SiO_2$ as may be the second layer which in any event comprises a material having a refractive index of between 1.4 and 1.8.

In this embodiment of a display device made in accordance with the present invention, the first and second layers of a four layer anti-reflection coating each have a thickness of the order of λ/8, the third layer has a thickness of the order of λ/2 and the outermost layer has a thickness of the order of λ/4, where λ is equal to a desired central wavelength selected from the eye sensitivity curve.

The present invention also relates to a display device having an optically transparent faceplate, an anti-reflection coating on an external surface of the faceplate, the anti-reflection coating comprising at least 3 evaporated layers which have been hardened by annealing. The material of one of the layers has a high refractive index with respect to that of the material of the faceplate and another one of the layers having a low refractive index with respect to that of the material of the faceplate.

The display device may comprise a cathode ray tube such as a colour cathode ray tube, a projection television tube in which case the center wavelength is the wavelength of the phosphor, a data graphic display (D.G.D.) tube or an oscilloscope tube.

BRIEF DESCRIPTION OF THE DRAWING

In the drawings, corresponding reference numerals have been used to indicate similar features.

DETAILED DESCRIPTION OF THE PREFERRED EMBODIMENTS

Figure 1:
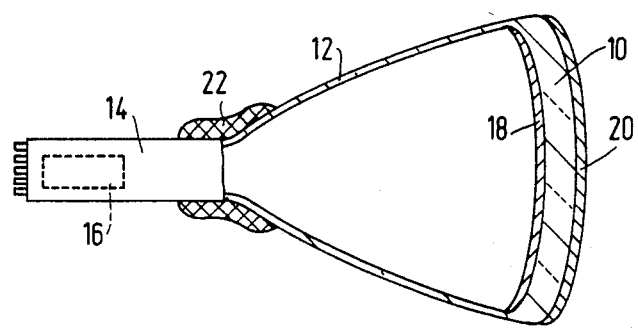
FIG. 1 is an elevational view of a cathode ray tube with a portion of its wall broken away.

The cathode ray tube shown in FIG. 1 comprises an envelope formed by an optically transparent faceplate panel 10 which is connected to a conical portion 12, a neck 14 is connected to the conical portion 12. An electron gun 16 is disposed within the neck 14. A cathodoluminescent screen 18 is provided on the inside of the faceplate panel 10. An anti-reflection coating 20 is provided on the outside surface of the faceplate panel 10 which is composed of a mixed alkali glass substantially free of lead oxide (PbO). An electron beam (not shown) produced by the electron gun 16 is scanned over the screen by a deflection coil assembly 22 provided at the neck-conical portion transition of the envelope.

The illustrated cathode ray tube may comprise a monochrome tube, a PTV tube or an oscilloscope tube. However the invention can be applied to a shadow mask display tube or to any other display device because it is primarily directed to enhancing the contrast of an image by reducing reflections from the outer surface of the faceplate.

Figure 2:
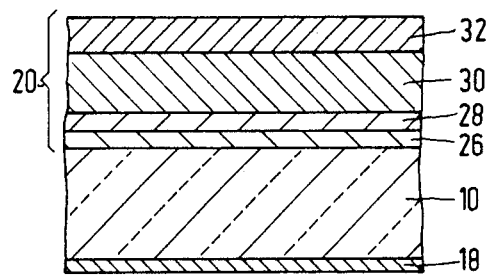
FIG. 2 is diagrammatic cross-sectional view through a portion of the faceplate structure having an anti-reflection coating thereon.

The faceplate structure and anti-reflection coating 20 shown in FIG. 2 have not been drawn to scale. The illustrated anti-reflection coating 20 comprises four contiguous layers 26, 28, 30, 32 applied by vacuum evaporation at ambient temperatures onto the faceplate panel 10. The layers 26 to 32 have different thickness and the layers 26 and 30 are of a material, such as $Nb_2O_5$, having a relatively high refractive index and the layers 28 and 32 are of a material, such as $SiO_2$, having a relatively low refractive index. Although the precise thickness of each of the layers 26 to 32 is selected having regard to the refractive index, n, of the material in each layer and the optical performance required, the thickness of each of the layers 26, 28 is of the order of λ/8, that of the layer 30 is of the order of λ/2 and that of the layer 32 is of the order of λ/4, where λ is equal to the desired center wavelength selected from the eye sensitivity curve shown in FIG. 3. One advantage of having layers of different thicknesses is that interference effects are reduced. Materials such as $Nb_2O_5$ and $SiO_2$ form medium hardness layers when evaporated on to the unheated faceplate panel 10 at ambient temperature which is of the order of 80° C. However unlike materials such as $MgF_2$ these layers can be hardened subsequently by high temperature annealing to make them scratch resistant.

In fabricating such a 4-layer coating, it has been found desirable to deposit a layer of $Nb_2O_5$ onto the glass and have the outermost low refractive index layer comprise $SiO_2$. However such an arrangement is not obligatory.

The second layer 28 may comprise a different material. from $SiO_2$, such different materials including $Al_2O_3$, MgO, or $CeO_2$. Some of the criteria for the selection of the material for this layer are that it has a refractive index between 1.4 and 1.8, and that it can be evaporated as a relatively hard layer which can be annealed to a harder layer subsequently.

Figure 3:
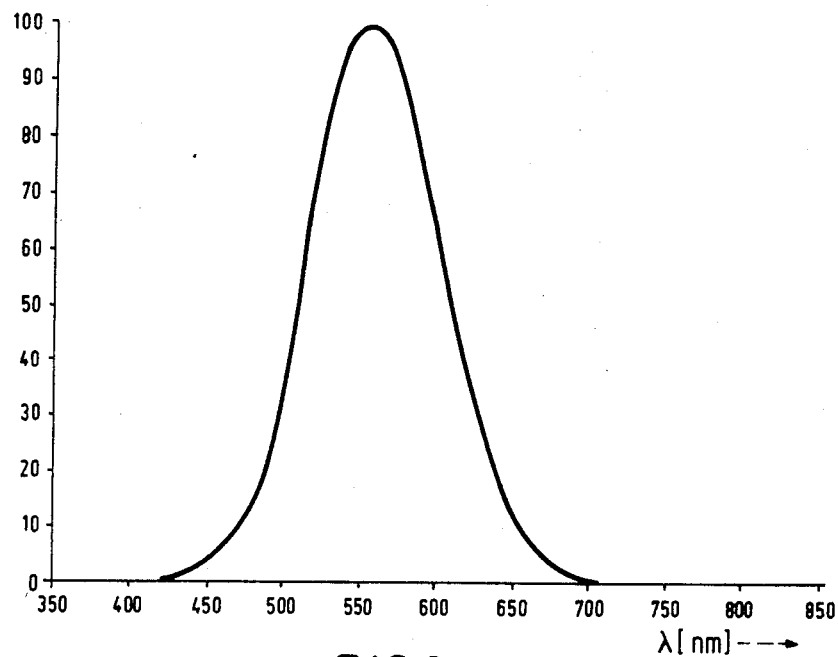
FIG. 3 is a sensitivity curve of a human eye.

FIG. 3 is a sensitivity curve 34 of a human eye. The abscissa is wavelength, λ, in nanometers (nm.) and the ordinate is calibrated in arbitrary units. The curve is generally Gaussian and has a peak value at about 550 nm.

Figure 4:
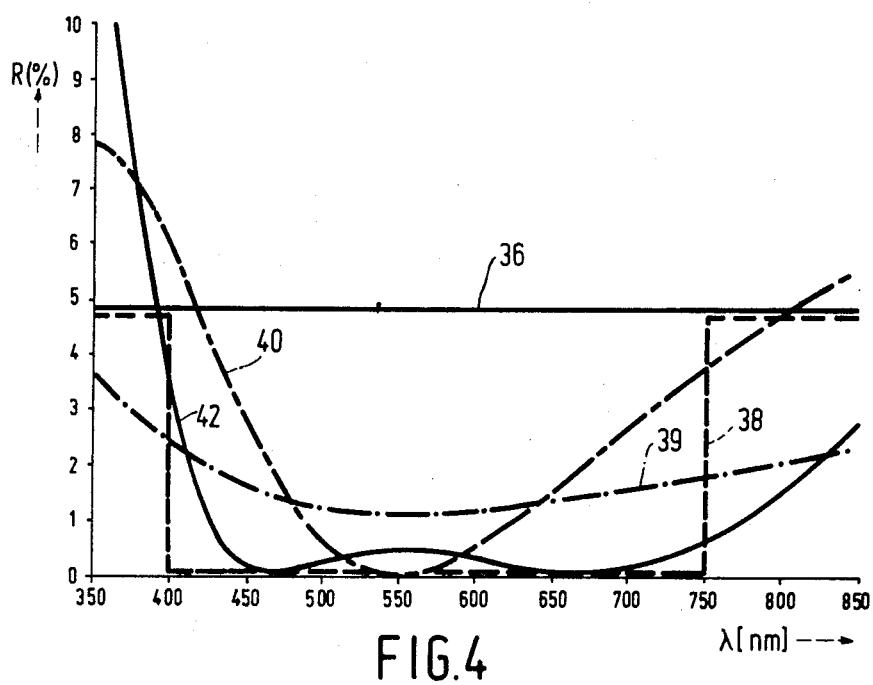
FIG. 4 shows a number of reflectance curves which are useful for explaining the performance of different types of anti-reflection coatings.

FIG. 4 shows graphs of wavelength, λ, against reflectance (R) in per cent of glass and the reflectances of coatings having 1, 2 or 3 filter layers. The reflectance of glass is shown by a horizontal line 36 having a reflectance value of 4.9%.

In order to eliminate reflections at least over the range of wavelengths to which the eye is sensitive, an anti-reflection coating would ideally have a rectangular characteristic 38 shown in broken lines. A typical single layer anti-reflection coating has a characteristic shown by the chain-dot line 39 which has a minimum reflectance value at about 550 nm. A typical double layer V-coat filter characteristic is shown by the chain-double dot line 40 and has a minimum or zero reflectance over a short range of wavelengths which makes such an anti-reflection coating suitable for use on lasers. The characteristic of a 3-layer W coating is shown by the line 42. The presence of a third layer has the effect of pulling the flanks of the V-characteristic 40 sideways to produce a curve which is closer to the idealised characteristic. By providing 4 or more layers the reflectance curve obtained approximates closer to a rectangle. In the case of a 4 layer coating, the layer thicknesses are of the order of λ/8, λ/8, λ/2 and λ/4 beginning from the glass substrate.

Figure 5:
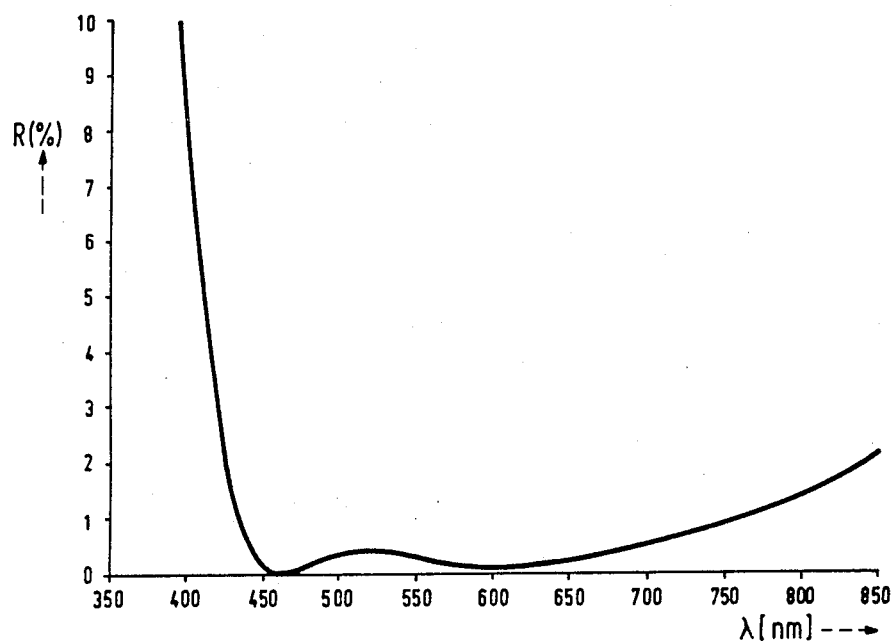
FIGS. 5 and 6 illustrate the reflectances of anti-reflection coatings having 4 and 7 layers, respectively.

FIG. 5 is a graph of the reflectance (R) of a 4-layer anti-reflective coating made by the method made in accordance with the present invention. The anti-reflective coating comprises a first layer of $Nb_2O_5$, which has a high refractive index (2.14) and an optical thickness $nd/\lambda=0.079$, applied to the faceplate panel, a second layer of $SiO_2$ which has a low refractive index (1.43) and an optical thickness 0.092, a third layer of $Nb_2O_5$ which has an optical thickness of 0.577 and an outermost layer of $SiO_2$ which has an optical thickness of 0.249.

Figure 6:
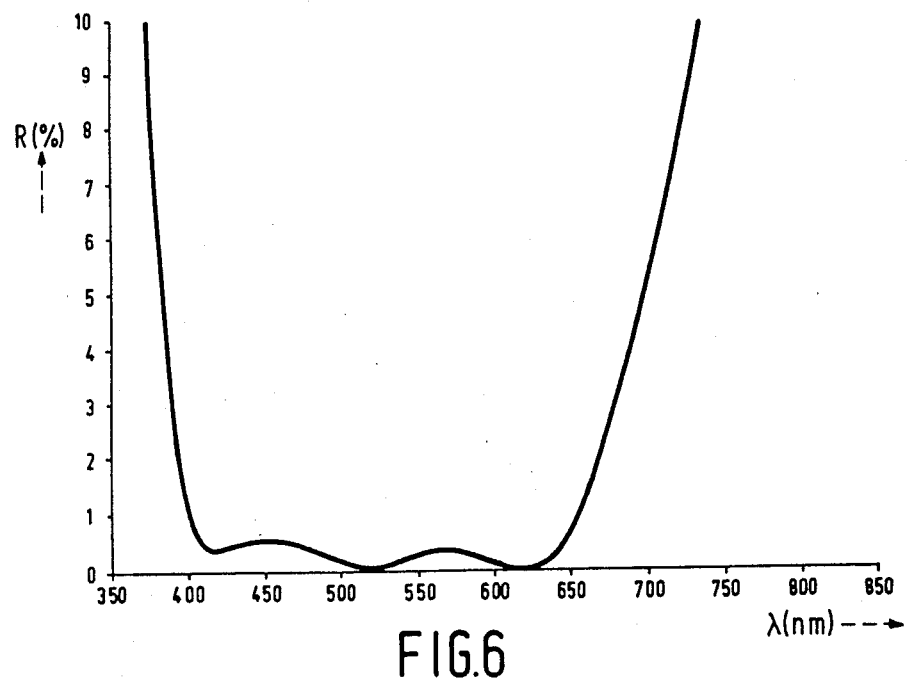

FIG. 6 is a graph of the reflectance (R) of a 7-layer anti-reflective coating made by the method made in accordance with the present invention. The coating comprises alternate layers of $SiO_2$ and $Nb_2O_5$ whose refractive indices (n) after annealing are 1.45 and 2.10, respectively. The innermost and outermost layers are of $SiO_2$. The coating construction and optical thicknesses of the respective layers comprise:

|  |  | $(nd/\lambda)$ |
|---|---|---|
| Glass |  | — |
| Layer 1 | $SiO_2$ | 0.534 |
| 2 | $Nb_2O_5$ | 0.059 |
| 3 | $SiO_2$ | 0.119 |
| 4 | $Nb_2O_5$ | 0.491 |
| 5 | $SiO_2$ | 0.435 |
| 6 | $Nb_2O_5$ | 0.376 |
| 7 | $SiO_2$ | 0.193 |
| Air |  | — |

The illustrated curve is flatter compared to that shown in FIG. 5 and that over the wavelength range specified, the reflectance is less than 1% and in this respect approaches the ideal curve 38 more closely.

In the case of a 3-layer anti-reflective coating, an exemplary filter has a first layer of $Al_2O_3(n=1.63)$ and having an optical thickness of 0.25, a second layer of $Nb_2O_5$ and having an optical thickness of 0.50 and a third, outermost layer of $SiO_2$ and having an optical thickness of 0.25.

Figure 7:
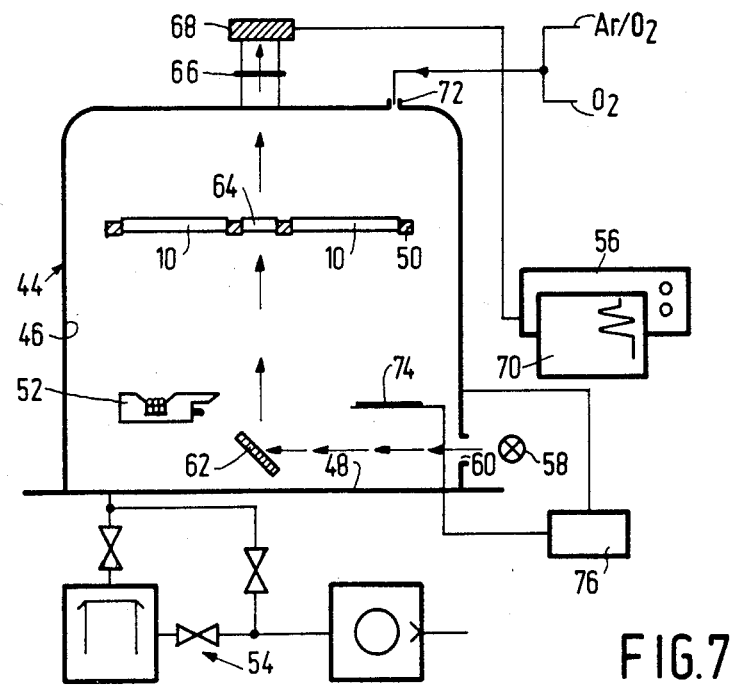
FIG. 7 is a diagrammatic view of an apparatus for carrying out the method in accordance with the present invention.

FIG. 7 illustrates diagrammatically an embodiment of the evaporation apparatus in which the filter layers of the anti-reflection coating are deposited on the faceplate panel 10. The apparatus comprises a Balzers BA510 optical coater 44 which includes a bell shaped cover 46 which is movable vertically relative to a base 48 for the introduction of, and removal of, faceplate panels 10 mounted in a rotatable support 50. The optical materials, such as $Nb_2O_5$ and $SiO_2$, are evaporated from an Airco - Temescal 8 kW four pocket electron gun 52. The electron gun 52 is arranged eccentrically in the space defined by the cover 46 in order to obtain a homogeneous thickness distribution on the rotating faceplate panels 10.

A pumping system 54 consisting of a DIFF 1900 oil-diffusion pump and a DUO 35 rotary are coupled to the interior of the evaporation apparatus by way of an entry port in base 48. The effective pumping speed for $N_2$ is 600 l/s and the ultimate pressure is $5 \times 10^{-7}$ Torr. A liquid $N_2$ Meissner trap is built-in for extra pumping speed for $H_2O$ during deposition.

The deposition rates are controlled with a quartz-crystal thickness monitor 56 (for example a Leybold IC-6000). The optical layer thickness nd is measured during evaporation, using an optical monitor, for example a monitor made by Dynamic Optics, which comprises a light source 58 which shines its light through a window 60 in the bell cover. This light is reflected by an inclined mirror 62 through a monitoring glass 64 carried by the rotatable support 50. The light transmitted by the monitoring glass 64 is filtered by a monochromatic filter 66 before impinging on a detector 68 of the monitor. The monitor 56 follows the transmission and its interference effects at chosen wavelengths.

An inlet 72 is provided in the cover 46 for the introduction of a mixture of argon (Ar) and oxygen ($O_2$) under reduced pressure during substrate cleaning and of oxygen only during evaporation. An aluminum rod 74 is mounted inside the cover 46 and is connected to a power supply unit 76 in order to establish a glow discharge during the substrate cleaning phase.

In carrying out the method in accordance with the present apparatus, the faceplate panels, which may have had their external surfaces mechanically roughened, are mounted in the rotatable support 50. The bell cover 46 is lowered onto the base 48.

Initially the system is evacuated to a pressure of the order of $5.10^{-6}$ Torr. Then the faceplate panels are cleaned using a glow discharge in an atmosphere of 90 % Ar/10% $O_2$ at a pressure of $10^{-1}$ to $10^{-2}$ Torr. The glow discharge current is of the order of 100 mA and the cleaning operation lasts for 15 minutes.

Then the evaporation phases are carried out beginning with $Nb_2O_5$ under a partial oxygen pressure of $3.10^{-4}$ Torr at a rate of 0.7 nm/s (nanometers/sec). Once the desired thickness of $Nb_2O_5$ has been deposited, the actual thickness being monitored using the thickness monitor 56, the electron gun 52 is switched to $SiO_2$ which is deposited under a partial oxygen pressure of $3.10^{-4}$ Torr at a rate of 1 nm./s. At the completion of the evaporation phases the evaporation apparatus is vented and the faceplate panels are removed.

Annealing of the coating 20 takes place subsequently at a temperature of 450° C. in air for about 1.5 hours. It is advantageous from the point of view of economising on the time required to make a cathode ray tube to anneal the coating during the normal processing of the cathode ray tube.

Annealing not only hardens the layers but also changes their refractive indices. Accordingly, when designing an anti-reflection coating, the performance specification must be related to the filter coating after annealing.

Although the coating 20 may comprise at least 3 layers, four or more layers will provide a more practical anti-reflection coating because the material choice is greater.

What is claimed is:

1. A display device having an optically transparent faceplate, an anti-reflection coating on an external surface of the faceplate, the anti-reflection coating comprising at least three layers of materials which are depositable at ambient temperature by evaporation and hardenable by subsequent annealing, said layers having been hardened by annealing, the material of one of said layers having a high refractive index with respect to that of the material of the faceplate and another one of said layers having a low refractive index with respect to that of the material of the faceplate.

2. A display device as claimed in claim 1, characterized in that the high refractive index material is $Nb_2O_5$.

3. A display device as claimed in claim 1, characterized in that the low refractive index material is $SiO_2$.

4. A display device as claimed in claim 1, characterized in that the outer surface of the faceplate is mechanically roughened.

5. A display device as claimed in claim 1, characterized in that the coating consists of four layers of which the first and second layers have a thickness of the order of $\lambda/8$, the third layer has a thickness of the order of $\lambda/2$, and the outermost layer has a thickness of the order of $\lambda/4$, where $\lambda$ is equal to a desired central wavelength.

6. A display device as claimed in claim 1, characterized in that the faceplate comprises the faceplate panel of a cathode ray tube and the material of the faceplate comprises a mixed alkali glass substantially free of lead oxide (PbO).

* * * * *